(12) United States Patent
DeSena

(10) Patent No.: US 6,198,807 B1
(45) Date of Patent: Mar. 6, 2001

(54) X-RAY LABELING TAPE

(76) Inventor: Danforth DeSena, 4 Ivie Rd., Cape Elizabeth, ME (US) 04107

( * ) Notice: Subject to any disclaimer, the term of this patent is extended or adjusted under 35 U.S.C. 154(b) by 0 days.

(21) Appl. No.: 09/330,861

(22) Filed: Jun. 11, 1999

(51) Int. Cl.[7] ..................................................... H05G 1/28
(52) U.S. Cl. ........................................... 378/165; 378/162
(58) Field of Search ...................................... 378/162, 165

(56) References Cited

U.S. PATENT DOCUMENTS

| | | | |
|---|---|---|---|
| 2,120,064 | * 6/1938 | Buckley | ................................ 378/165 |
| 2,162,420 | 6/1939 | Buckley . | |
| 3,790,802 | 2/1974 | Mika et al. . | |
| 3,917,952 | 11/1975 | Jackson . | |
| 4,764,948 | 8/1988 | Hurwitz et al. . | |

* cited by examiner

*Primary Examiner*—Craig E. Church
(74) *Attorney, Agent, or Firm*—Thomas L. Bohan; Robert P. Santandrea

(57) ABSTRACT

A marking tape for transferring information written thereon to a film when the film is exposed to x-rays. The tape is a laminate of an upper film, a radiopaque emulsion, and a lower film. The top surface of the upper film is partially coated with a writable ink, and the ink coating positioned directly over the radiopaque emulsion. Pressure exerted by the user while writing on the ink surface causes the underlying emulsion to part. When the marking tape is affixed to a film cassette, x-rays penetrate the marking tape in those areas where the emulsion has been parted, the underlying film is exposed, and the information entered on the marking tape is thereby transferred to the film. The marking tape can be made in different sizes and radiopacities that can be distinguished by color-coding the writable surface.

24 Claims, 3 Drawing Sheets

X-RAY LABELING TAPE

BACKGROUND OF THE INVENTION

1. Field of the Invention

This invention relates to a device for labeling and identifying x-ray films. Specifically, it relates to an identification tape that can be affixed to an x-ray film cassette. More specifically, it relates to an identification tape that can be adhesively affixed to such an x-ray film cassette. Even more specifically, the invention relates to an identification tape onto which information can be written—either manually or mechanically. More particularly, the invention relates to an identification tape that is capable of permanently transferring such information to the x-ray film in the cassette once the film is exposed. Still more particularly, the invention relates to an identification tape that can transfer either a direct image or a mirror image of such information to the x-ray film. Finally, the invention relates to collections of such tapes wherein different sizes or radiopacities are distinguishable from one other by color coding.

2. Description of the Prior Art

Efficient record keeping is essential in the medical arts. One must be able to readily and accurately identify the results of diagnostic studies of a patient. Particularly with x-rays, not only is there an immediate need to positively identify the patient with the x-ray film, but such identification must still be possible long after the film has been exposed. Unless the film itself is marked or labeled, there is a possibility that the film and the identification means will ultimately be separated and the unlabeled x-ray film will be misplaced and/or misidentified.

A number of prior-art devices have been developed to label x-ray films with patient information. One particular approach is to place a labeling device—such as a plaque or tape—on the surface of a film cassette and between the radiation source and the film. Such labeling devices usually include a layer of radiopaque material that prevents exposure of the underlying film. When sufficient pressure is applied, the layer of radiopaque material can be broken or thinned by inscribing information—either mechanically or manually—on the labeling device. X-rays can then pass through the interrupted radiopaque layer and reach the film underneath, exposing it in a pattern corresponding to the inscription made on the plaque.

Buckley (U.S. Pat. No. 2,120,064; issued 1938 (hereinafter referred to as '064)) describes a plaque to be placed on an x-ray film cassette during exposure. The plaque has a cover sheet of yieldable material such as cellophane and a backing material coated with a material impermeable to x-rays. The cover sheet yields to the pressure of writing with a "suitable stylus" and the layer of radio-impermeable material is interrupted wherever the stylus has been used to inscribe information. The impermeable material used in the Buckley '064 device may be either lead or a lead salt, applied either in sheet form or by dusting an adhesive with such materials in powdered form. Alternatively, a thick paste of a lead compound such as "white lead"—i.e., lead oxide—may be spread evenly on the backing sheet. A translucent cellophane cover sheet allows the information inscribed on the radiopaque layer to be visually inspected. This device is prone to failure, however, when either the pressure applied by the stylus is insufficient to deform the underlying radiopaque material or where the cover sheet is "unduly thick."

A second identification plaque described by Buckley (U.S. Pat. No. 2,162,420; issued 1939 (hereinafter referred to as '420)) replaces the cover sheet of the earlier Buckley ('064) plaque with a cover layer of metal powder—preferably aluminum—that is transparent to x-rays. A layer of plastic radiopaque material containing white lead, glycerine, and a drying agent is applied to a backing member and the metal powder is dusted thereon. Excess powder is removed and the edges of the plaque are then painted with ordinary paint of unspecified color. An inscribing stylus penetrates both the metallic powder cover layer and the plastic material to contact a backing layer. Penetration of the plastic radiopaque layer produces an image of the inscription on the underlying film when the film is exposed to x-rays. The Buckley '420 device permits the radiopaque layer to be deformed more easily, but does not address the problem of visibility of the information inscribed on that layer.

Mika et al. (U.S. Pat. No. 3,790,802; issued 1974) describes a marker in which the inscribable surface is a foil of either indium, indium-lead alloy, or indium-tin alloy. The foil layer is applied to a paper support. The outer surface of the indium layer can be coated with a "bright, specifically white layer" to provide an easily inscribable area and improve the visibility of any writing on the marker. Neither markers of varying sizes and radiopacities nor an incscribable layer having a color other than white are contemplated by Mika et al. The white inscribable layer described therein does not provide a means of distinguishing differently-sized markers, or markers having different radiodensities.

The film identification device of Jackson (U.S. Pat. No. 3,917,952; issued 1975) has an outer sheet of material—such as paper or roughened polyethylene—that is capable of being easily marked by a pen or a pencil. A thin sheet of lead is typically used as the radiopaque material in this device, although finely divided lead oxides or barium sulfates may be used as well. The device, which includes additional backing sheets, is adhesively affixed to the film. Markers of various sizes and radiopacities were not addressed by Jackson.

Hurwitz (U.S. Pat. No. 4,764,948; issued 1988) describes an x-ray marking device in which the film can be labeled using a ball point pen, typewriter, or other types of mechanical marking instruments. The device includes a flexible substrate, a foil layer of fracturable radiopaque material overlying a soft material, such as polyester or plastic, that is transparent to x-rays, and a single adhesive layer covered by a peelable shield. Once the information is impressed upon the marking device, the shield is removed from the adhesive and the marking device is attached to the film cassette. The radiopaque material in the Hurwitz device is preferably lead or tin. A printable layer of titanium-white paint is applied over the layer of radiopaque material in order to improve the visibility of the information being imprinted onto the fracturable radiopaque layer. Means for differentiating among markers of various sizes are not addressed. The Hurwitz marking system permits a mirror image of the information inscribed on the device to be transferred to the film. Such a mirror image is properly oriented when viewed form the side of the film opposite from the x-ray source. When affixed to a film cassette, the Hurwitz marking device, because it has a single adhesive layer adjacent to the blocking area, is susceptible to hinging or flopping downward when the cassette is vertically deployed.

As mentioned above, each of the prior-art devices for marking x-ray films suffer from several disadvantages. For one, many such marking devices use a metallic foil as the radiopaque material. A considerable amount of pressure is often necessary to sufficiently 'thin' such foils such that the underlying film will be sufficiently exposed and the information transferred. When such information is handwritten upon such markers, the pressure applied to the foil may be insufficient to thin it.

Another problem associated with the prior-art marking devices is the readability of what has been written on the surface of the marker (as opposed to reading the message that ends up on the film). If the information cannot be read, its accuracy cannot be ensured. Attempted solutions to this problem have included coating the radiopaque material—frequently a metal foil—with titanium white paint or covering it with a cover sheet of cellophane or smooth plastic. Neither of these approaches holds pencil marks or ink well, and any information written thereon is difficult to read.

Another limitation of the prior-art marking systems relates to the method used to read the exposed x-ray film. In some areas of medicine—such as mammography—it is customary to view the 'back,' (i.e., the glossy side) of the film. To anticipate this type of use, it is helpful to transfer a mirror image of the information to the film. None of the prior-art systems provides a means for securely attaching the identification marker to the film cassette when the cassette is vertically oriented such that a mirror image of the information written on the marker is transferred to the film. An additional shortcoming of the prior-art film marking systems is their failure to facilitate the use of markers of different sizes and radiopacities. In practice, the x-ray film used varies in size from one application to another within different fields of medicine. It is therefore important to have film markers of various sizes and a simple means for distinguishing between them. Furthermore, depending on the purpose or body part being x-rayed and the purpose of the x-ray—i.e., dental, chest, mammogram—the x-ray energy may vary as well. Consequently, it may be desirable to have markers with different, but well-defined, radiopacity ranges. Simply tailoring the thickness of a metal foil to achieve this may be difficult. Thin foils that could be possibly used in a less radiodense marker would be susceptible to tearing. Conversely, a thick film used in a marker of high radiopacity would be extremely difficult to thin with the amount of force normally applied by a stylus. In addition, the existence of markers having different ranges of radiopacity gives rise to the need to be able to readily distinguish markers having one value of radiopacity from markers having another such value.

The prior-art systems thus fail to provide a means for marking x-ray films that addresses the problems described above. Therefore, what is needed is a device for marking x-ray films that allows information to be handwritten on a flexible x-ray marking tape in such a way that it is then reliably transferred to an underlying x-ray film. What is also needed is such a marking tape that allows the user to easily see what has been written on the tape itself What is further needed is such a marking tape that will remain securely affixed to a film cassette regardless of cassette orientation. In addition, what is needed is such an x-ray marking tape that is capable of transferring a mirror image of the information inscribed on the tape. What is still further needed is to have a variety of such marking tapes of different radiopacities and sizes, coded according to their size and/or radiopacity, respectively.

SUMMARY OF THE INVENTION

It is an object of this invention to provide a device for marking x-ray films that allows information to be handwritten on a flexible x-ray marking tape and be reliably transferred to an underlying x-ray film. It is also an object of the invention to provide such a marking tape that allows the user to easily see what has been written on the tape. It is yet another object of the invention to provide such an x-ray tape that will remain securely affixed to a film cassette regardless of cassette orientation. In addition, it is an object of the invention to provide such a x-ray marking tape that is capable of transferring a mirror image of the information inscribed on the tape. It is yet a further object of the present invention to provide a series of such x-ray marking tapes of different radiopacities and sizes, respectively, that are coded according to the size and radiopacity.

The present invention meets these objectives and overcomes the problems of the prior art by providing an x-ray marking tape that includes an emulsion of radiopaque material covered by a colored writable ink. The tape is actually a primary laminate of, respectively, an upper film, the emulsion, and a bottom film. The radiopaque emulsion has the form of a partial width strip aligned along the longitudinal axis of the marking tape. The upper film has a top surface, a substantial portion of which is coated with a colored writable ink, and a bottom surface that is partially coated with a pressure sensitive adhesive. The adhesive coating bonds to the upper surface of the lower film and encapsulates the emulsion between the two tapes. The lower surface of the bottom film is also coated with a pressure-sensitive adhesive. A peelable slit-cut paper backing is bonded to the adhesive on the bottom film.

Information can be entered on the marking tape by writing on the upper surface of the upper film with a sharp writing instrument, such as a ball point pen or a sharpened pencil. The upper surface is longitudinally zone-coated with a writable ink surface. The coating obscures the underlying partial-width radiopaque emulsion laminated between the two tapes and provides a matte writing surface having sufficient 'tooth' to accept ink or graphite. This allows a pen or pencil to leave a plainly visible mark on the surface of the tape. A user can easily see what information has been entered and where it has been entered.

The action of writing information on the tape imparts pressure to the underlying emulsion of radiopaque material. Under this pressure, the pliable emulsion is parted. X-rays can then pass through these areas of the tape and expose the film underneath, creating an 'positive' image of the information written on the marker on the film. Once the information is recorded on the marker, the paper backing is removed to expose the adhesive on the lower tape and the tape laminate is affixed to a film cassette. Some x-ray procedures may require the tape to be vertically oriented. The pressure-sensitive adhesive is sufficiently strong to hold the marker in place even when it is so positioned. The tape may placed over a backing plate that is slightly smaller than the tape itself, thereby affixedly sandwiching the backing plate between the tape and the cassette. The backing plate may contain 'static' data, such as the name and/or address of the doctor or clinic where the x-ray is taken.

In the field of mammography, the emulsion side of the film (also referred to as the "dull side") is oriented towards the x-ray tube. However, most radiologists examine the exposed x-ray film from the reverse side (also referred to as the "glossy side") of the film. Because x-ray markers of the type being discussed here must be placed between the x-ray source and the film, a radiologist viewing the glossy side of an exposed mammogram would see the mirror image of any data written on the upper face of the marker. This problem can be overcome by modifying the configuration of the marker of the present invention by putting pressure sensitive adhesive on the top surface of the upper film of the laminate. In this version of the marker, the adhesive is applied in longitudinal strips that are parallel to and do not substantially overlap the zone-coated writable ink layer on the top surface of the marking tape. Each strip of adhesive is covered with a peelable paper backing, and the adhesive and its paper backing are oriented such that the writable surface on the top surface of the upper film remains exposed for writing. Information is entered on this writable surface, thus forming gaps in the underlying emulsion as previously described. The adhesive on the upper tape is then exposed by removing the paper backing, and the marking tape is affixed to the film cassette with the written surface face down against the cassette. The presence of more than one strip of adhesive on the top surface of the marking tape prevents the tape from hinging or flopping downward when the cassette is vertically oriented.

User requirements often dictate the size and radiopacity of an x-ray marking device. Some users may prefer—or require—an x-ray marking tape having a larger writing area, while others may need a narrower tape in order to maximize the film area available for the diagnostic image. In some applications, the x-ray intensity is quite high (such as for chest or large-animal veterinary x-rays). In these situations, a marker having a higher radiopacity may be necessary to prevent 'wash out' of the written information by the intense radiation. Conversely, a less radiopaque marker may be preferred for the low intensities generally used to obtain x-rays of extremities or small-animals. In the device of the present invention, the zone-coating of writable ink is color-coded to identify the product according to its radiopacity or tape size.

The x-ray marking tape of the present invention is readily adapted to new radiographic methods—such as computer radiography—that do not use photographic film. The marking tape is simply placed between the x-ray source and the radiation-sensing device that replaces the film cassette.

In conclusion, the present invention allows written information to be transferred to the surface of an x-ray film such that the image can be easily read from the film, irrespective of side of the film that is normally studied. The present invention also allows attending personnel to readily differentiate between markers of varying sizes and radiopacities.

DETAILED DESCRIPTION OF THE PRESENT INVENTION

Figure 1:
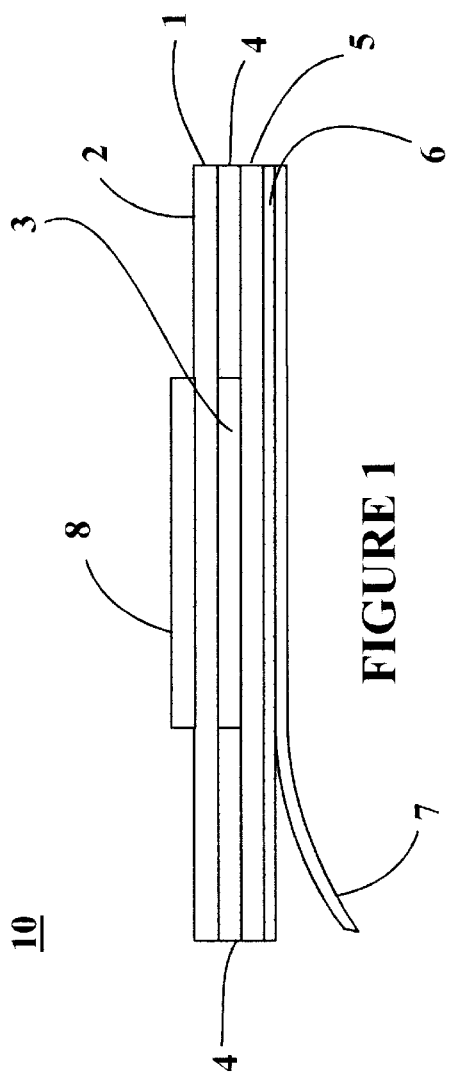
FIG. 1 is a cross-sectional view of the x-ray marking tape of the present invention having a layer of pressure-sensitive adhesive on the lower film.

FIG. 1 is a cross-sectional view of one of the Preferred Embodiments of the invention, adapted to be affixed to an x-ray film cassette with the upper surface of the marking tape facing upwards and away from the surface of the film cassette. The marking tape 10 is a permanent laminate of an upper film 1, a radiopaque emulsion 3, and a lower film 5. The radiopaque emulsion 3 is centered along the longitudinal axis of the marker 10 and has a width that is less that of the marking tape 10. A middle coating of pressure-sensitive adhesive 4 is placed on the lower surface of the upper film 1, so as to bond the upper film 1 to the lower film 5, thereby sandwiching the radiopaque emulsion 3 between the two films. The bottom surface of the lower film 5 is coated with a bottom coating of pressure-sensitive adhesive 6. A peelable release backing 7 covers and protects the bottom coating of pressure-sensitive adhesive 6 until the marking tape 10 is to be affixed to a film cassette. The upper film 1 and the lower film 5 may be manufactured from any of many suitable materials, such as clear plastic, paper, or non-woven polyester, chosen for their flexibility and, in the case of the upper film, the capacity to support a writable surface.

Figure 2:
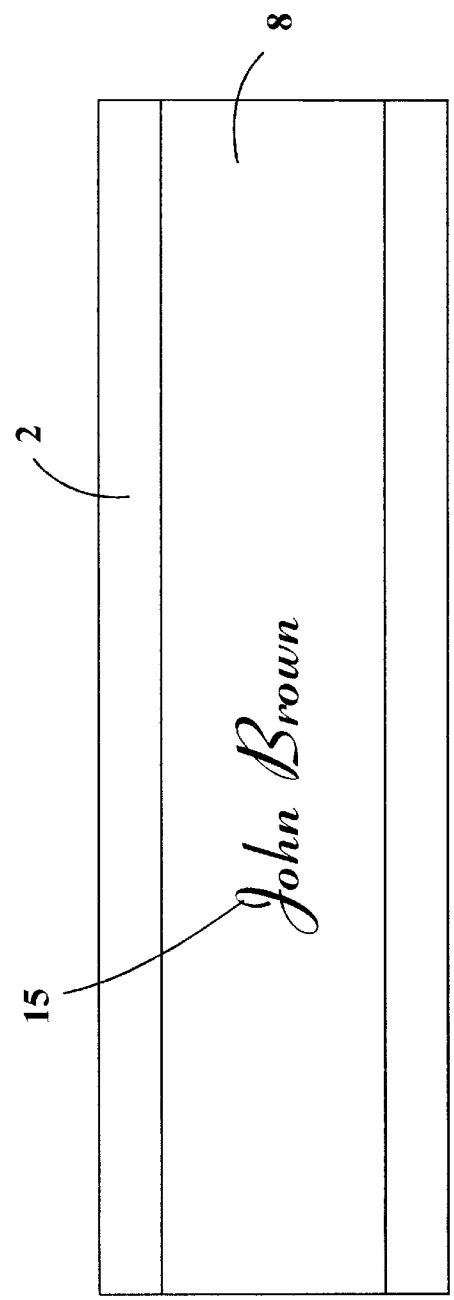
FIG. 2 is a top view of an x-ray marking tape having a layer of pressure-sensitive adhesive on the bottom surface of the lower tape.

The top surface 2 of the upper film 1 is longitudinally zone-coated with a stripe of writable ink 8. The width of the stripe of writable ink 8 is sufficient to obscure the underlying radiopaque emulsion 3. The ink has a matte finish and sufficient "tooth" to retain ink or graphite when a user writes on the coated upper surface 2 with a ball-point pen or a pencil, leaving a visible line on the stripe of writable ink 8. A top view of the marking tape 10 is shown in FIG. 2, depicting patient information 15 that has been written on the stripe of writable ink and is visible to the user.

The action of writing information on the stripe of writable ink 8 causes the underlying radiopaque emulsion 3 to part or be thinned out to create an area where x-rays are able to penetrate the marking tape 10 and expose the film below. In the preferred embodiments of the present invention, the radiopaque emulsion 3 is a suspension of powdered radiopaque material in a polymer carrier that has a low melting temperature. The polymer carrier must be sufficiently soft and plastic at room temperature to deform under the pressure of a writing instrument. Among the radiopaque materials that may be used are lead, tin, tungsten, antimony, bismuth, bismuth oxide, or any mixture of the above. The radiopacity of the radiopaque emulsion 3 can be tailored for a particular application by selecting a material having an appropriate radiopacity, by varying the amount of radiopaque material in the radiopaque emulsion 3, or by varying the thickness of the radiopaque emulsion 3. In the preferred embodiments, tin powder having a 10 micron particle size is mixed with the polymer carrier to form the radiopaque emulsion 3. The amount of tin used in the radiopaque emulsion 3 is between 40 and 80 percent by volume.

Figure 3:
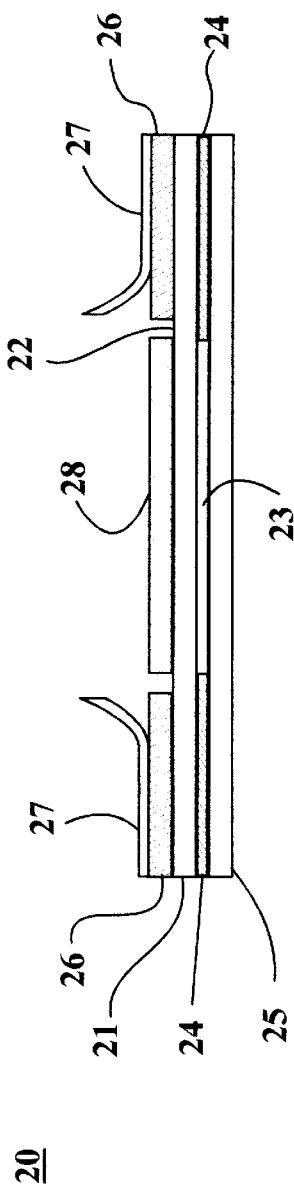
FIG. 3 is a cross-sectional view of an x-ray marking tape having a layer of pressure-sensitive on the top surface of the upper tape.
Figure 4:
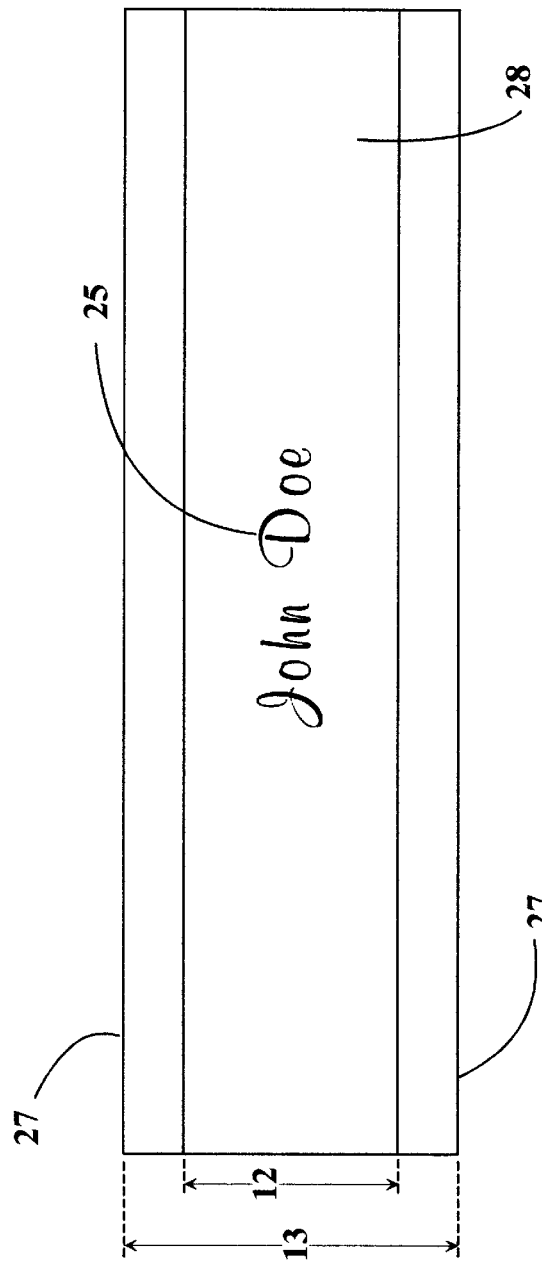
FIG. 4 is a top view of an x-ray marking tape having a layer of pressure-surface adhesive on the top surface of the upper tape.

In fields such as mammography, the exposed x-ray film is viewed from the glossy side of the film. A person looking at the film in this manner would see a reverse or mirror image of the information entered on the marking tape 10 as configured in FIG. 1. FIG. 3 is a cross-sectional view of a reverse marking tape 20 of the present invention that produces a properly oriented image when the exposed film is viewed from its glossy side. The reverse marking tape 20 is a permanent laminate of an upper film 21, a radiopaque emulsion 23, and a lower film 25, held together by a middle coating of pressure-sensitive adhesive 24. A longitudinally zone-coated stripe of writable ink 28, of sufficient width to obscure the underlying radiopaque emulsion 23, covers a portion of the top surface 22 of the upper film 21 of the reverse marking tape 20. Two strips of pressure-sensitive adhesive coating 26, parallel to and on either side of the stripe of writable ink 28, are also applied to the top surface 22 of the upper film 21. The presence of the strips of pressure-sensitive of adhesive coating 26 prevent the reverse marking tape 20 from hinging or flopping down when the cassette is oriented in a vertical position. The strips of pressure-sensitive adhesive 26 are covered by longitudinally-oriented peelable release strips 27, preferably made of paper. A top view of the reverse marking tape 20 is shown in FIG. 4. The peelable release strips 27—and the underlying pressure sensitive adhesive coatings 26—are located on either side of the stripe of writable ink 28 and parallel to it.

Once information 25 is entered on the stripe of writable ink 28 and the radiopaque underlying emulsion 23 parted, the peelable release strips 27 are removed, exposing the strips of pressure-sensitive adhesive 26. The reverse marking tape 20 is then affixed to the film cassette with the top surface 22 of the upper tape and the strip of writable ink 28 face down, i.e., facing the film cassette. With the reverse marker so positioned, the information 25 written on the stripe of writable ink 28 is transferred to the x-ray film as a mirror image. When the processed film is viewed from the glossy side, the information 25 is properly oriented and easily readable.

Figure 5:
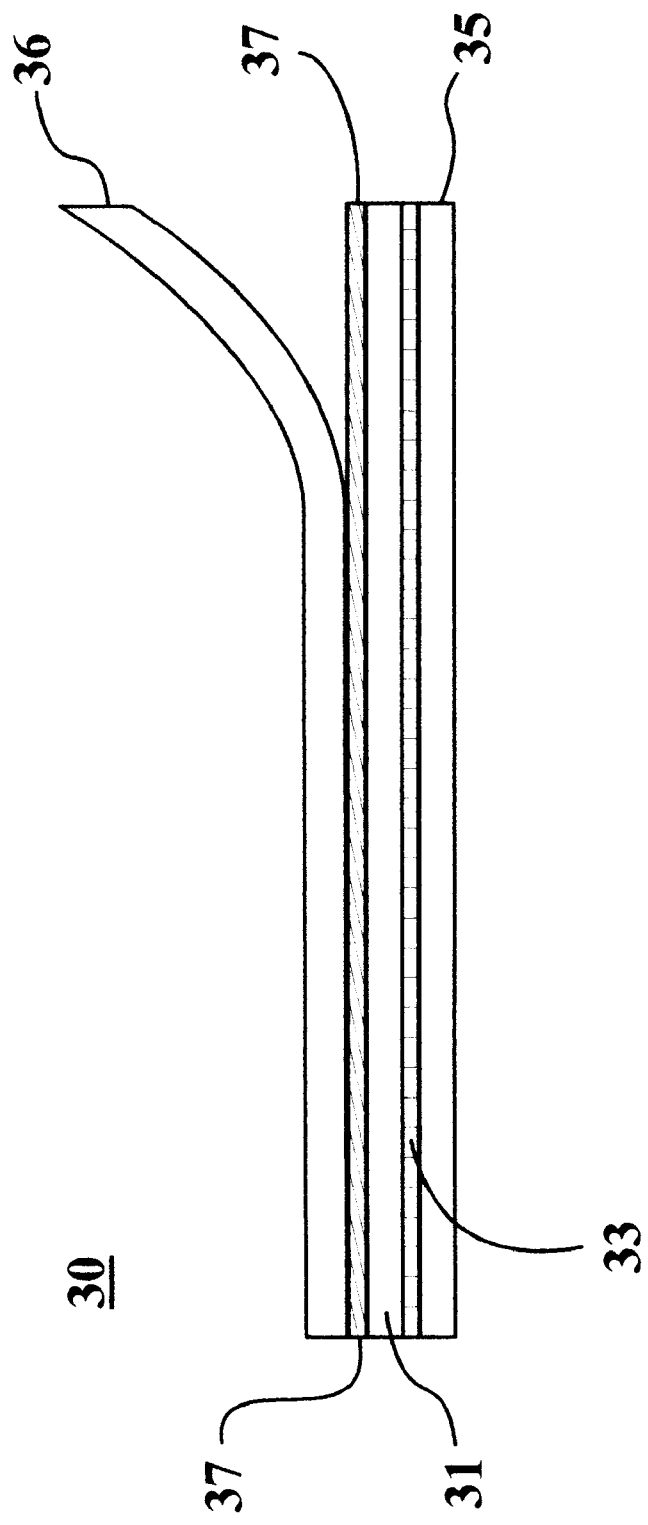
FIG. 5 is a cross-sectional view of an x-ray marking tape having a removable writable film attached to the top surface of the upper tape.

Some users may want additional film space to be available to image an anatomical area of interest. The present invention meets this need by providing a reduced-width reverse marking tape 30, shown in a cross-sectional view in FIG. 5, that includes an removable writable film 36—preferably made of paper or plastic. The peelable writable film 36 is held to the upper film 31 by a full width coating of pressure-sensitive adhesive 37. The upper film 31, radiopaque emulsion 33, and lower film 35 form a laminate that is held together by the inherent tackiness of the radiopaque emulsion 3. After entering information on the removable writable film 36, the removable writable film 36 is peeled away and the reduced-width reverse marking tape 30 is affixed to a film cassette with the full width coating of pressure-sensitive adhesive 37 facing the cassette. In contrast to the reverse marking tape 20, the width of the reduced-width reverse marking tape 30 need not extend beyond the width of the radiopaque emulsion 33.

Both film size and x-ray intensity vary from one application to another. A larger film is needed for a chest x-ray, for example, than for an x-ray of a hand. In the latter case, a smaller area is available for marking the film, and a smaller-sized marker of the present invention is required. A higher intensity is required for a chest x-ray than for a mammogram. The marking tape of the present invention may be manufactured in various widths and radiopacities to meet these different needs. The strip of writable ink 8 of the marking tape 10, the strip of writable ink 28 of the reverse marking tape 20, and the removable writable film 36 can be color coded to facilitate identification of markers of varying width and radiopacity.

It should be understood that the preferred embodiments described herein are merely illustrative of the present invention. Numerous variations in design and use of the present invention may be contemplated in view of the following claims without straying from the intended scope and field of the invention.

I claim:

1. An x-ray marking tape, said x-ray marking tape comprising:
    a) an upper film, said upper film having a first top surface and a first bottom surface;
    b) a lower film, said lower film having a second top surface and a second bottom surface;
    c) a radiopaque emulsion, said radiopaque emulsion being disposed in a first predetermined position between said upper film and said lower film and in contact with said first bottom surface and said second top surface;
    d) a writable surface disposed on a first portion of said first top surface in a second predetermined position such that said writable surface overlays said radiopaque emulsion;
    e) at least one adhesive layer, said adhesive layer being disposed in a region between said upper film and said lower film and in contact with said first bottom surface and said second top surface; and
    f) an adhesive coating disposed on at least one portion of one of said first top surface and said second bottom surface.

2. The x-ray marking tape as claimed in claim 1 wherein said writable surface is an ink coating, said ink coating having a predetermined color, covering a first portion of said first top surface, and being disposed in a strip parallel to a longitudinal axis of said marking tape.

3. The x-ray marking tape as claimed in claim 1 wherein said radiopaque emulsion comprises a polymer, said polymer being plastic at room temperature, and a radiopaque powder.

4. The x-ray marking tape as claimed in claim 3 wherein said radiopaque powder is selected from the group consisting of lead, indium, tin, tungsten, antimony, bismuth, and bismuth oxide.

5. The x-ray marking tape as claimed in claim 3 wherein said radiopaque powder is a mixture of powders selected from the group consisting of lead, indium, tin, tungsten, antimony, bismuth, and bismuth oxide.

6. The x-ray marking tape of claim 3 wherein said radiopaque powder is tin.

7. The x-ray marking tape of claim 6 wherein said radiopaque powder has a particle size of 10 microns.

8. The x-ray marking tape of claim 1 wherein said adhesive coating is disposed on a portion of said second bottom surface.

9. The x-ray marking tape of claim 8 further comprising a peelable release backing, said peelable release backing being disposed on said adhesive coating.

10. The x-ray marking tape of claim 2 wherein said adhesive coating covers a second portion and a third portion of said first top surface, both said second portion and said third portion being parallel and adjacent to said first portion of said top surface.

11. The x-ray marking tape of claim 10 further comprising a first peelable release backing and a second peelable release backing, said first peelable release backing being disposed on said adhesive coating covering said second portion and said second peelable release backing being disposed on said adhesive coating covering said third portion.

12. A marking tape adapted to transfer information written on said marking tape to an x-ray film upon exposure of said x-ray film to x-rays, said marking tape comprising:
    a) an upper film having a top surface and a bottom surface;
    b) a lower film having an upper surface;
    c) a radiopaque emulsion, said radiopaque emulsion being disposed between said upper film and said lower film in a strip along longitudinal axes of said upper film and said lower film, said strip having a first predetermined position, and said radiopaque emulsion being in contact with a first portion of said bottom surface and said upper surface;
    d) a first adhesive coating, said first adhesive coating being disposed in a first longitudinal strip parallel to said strip of said radiopaque emulsion and being in contact with a second portion of each of said bottom surface and said upper surface;

e) a second adhesive coating, said second adhesive coating being disposed in a second longitudinal strip parallel to said strip of said radiopaque emulsion and said first strip and being in contact with a third portion of each of said bottom surface and said upper surface;

f) a writable surface comprising an ink coating covering a first portion of said first top surface and having a predetermined color, said writable surface being disposed on said top surface in a writable strip along said longitudinal axes of said upper tape and said lower tape in a second predetermined position such that said writable surface overlays said radiopaque emulsion; and g) at least one adhesive strip, said adhesive strip covering a second portion of said top surface and being parallel to said writable strip.

13. The marking tape of claim 12 wherein said radiopaque emulsion comprises a polymer, said polymer being plastic at room temperature, and a radiopaque powder.

14. The marking tape of claim 13 wherein said radiopaque powder is selected from the group consisting of lead, indium, tin, tungsten, antimony, bismuth, and bismuth oxide.

15. The marking tape of claim 13 wherein said radiopaque powder is a mixture of powders selected from the group consisting of lead, indium, tin, tungsten, antimony, bismuth, and bismuth oxide.

16. The marking tape of claim 13 wherein said radiopaque powder is tin.

17. The marking tape of claim 16 wherein said radiopaque powder has a particle size of 10 microns.

18. The marking tape of claim 12 further comprising a peelable release backing, said peelable release backing being disposed on said adhesive coating.

19. A marking tape adapted to transfer information written thereon to a film upon exposure of said film to x-rays, said marking tape comprising:

a) an upper film having an adhesive top surface and a bottom surface;

b) a lower film having an upper surface;

c) a radiopaque emulsion, said radiopaque emulsion being disposed between said upper film and said lower tape in a strip along longitudinal axes of said upper film and said lower film, said strip having a predetermined position, and said radiopaque emulsion being in contact with a portion of said bottom surface and said upper surface;

d) a writable surface having a predetermined color, said writable surface covering said adhesive surface and being peelable therefrom.

20. The marking tape of claim 19 wherein said radiopaque emulsion comprises a polymer, said polymer being plastic at room temperature, and a radiopaque powder.

21. The marking tape of claim 20 wherein said radiopaque powder is selected from the group consisting of lead, indium, tin, tungsten, antimony, bismuth, and bismuth oxide.

22. The marking tape of claim 20 wherein said radiopaque powder is a mixture of powders selected from the group consisting of lead, indium, tin, tungsten, antimony, bismuth, and bismuth oxide.

23. The marking tape of claim 20 wherein said radiopaque powder is tin.

24. The marking tape of claim 23 wherein said radiopaque powder has a particle size of 10 microns.

* * * * *